United States Patent [19]

Cooper et al.

[11] Patent Number: 5,139,699
[45] Date of Patent: Aug. 18, 1992

[54] SPRAY FORMULATION FOR THE TESTING OF SMOKE DETECTORS

[76] Inventors: Leon Cooper, 29706 Baden Pl., Malibu, Calif. 90265; William H. Haines, P.O. Box 263, Tarzana, Calif. 91356

[21] Appl. No.: 544,457

[22] Filed: Jun. 27, 1990

[51] Int. Cl.⁵ .................. C09K 3/30; G01M 19/00
[52] U.S. Cl. .................... 252/305; 73/1 G; 116/214; 222/4; 252/408.1
[58] Field of Search .............. 252/305, 408.1; 73/1 G; 116/214; 222/4

[56] References Cited

U.S. PATENT DOCUMENTS 3,936,403  2/1976  Sakaguchi et al. ........... 524/317 X
4,301,674 11/1981  Haines et al. .................. 252/305 X
4,715,985 12/1987  Pean et al. ..................... 73/1 G X
4,917,830  4/1990  Ortiz et al. .................... 252/305 X

FOREIGN PATENT DOCUMENTS 1527003 10/1978 United Kingdom ............. 73/1 G

OTHER PUBLICATIONS

Rose et al., *The Condensed Chemical Dictionary*, Sixth Edition, Reinhold Publ. Corp., New York (1961), p. 402.

*Primary Examiner*—Richard D. Lovering
*Attorney, Agent, or Firm*—Natan Epstein

[57] ABSTRACT

An improved aerosol formulation for activating a smoke detector by emulating the effects of combustion products to test smoke detectors includes a propellant and an active ingredient consisting of one or more linear alkyl phthalate esters characterized by linear carbon chains of either seven or nine carbons in length, the alkyl phthalate esters being present in a proportion of between 10% and 1%.

2 Claims, 1 Drawing Sheet

SPRAY FORMULATION FOR THE TESTING OF SMOKE DETECTORS

BACKGROUND OF THE INVENTION

1. Field of the Invention

The present invention relates generally to substances for simulating the effect of combustion products on electronic smoke detectors and more particularly relates to an improved environmentally safer formulation.

2. State of the Prior Art

Smoke detectors are commonplace fixtures in public buildings and private dwellings to protect lives and reduce property damage by giving early warning of fire. Numerous lives are lost through smoke inhalation every year before the fire has spread to the rooms occupied by the victims. In a private home a properly functioning smoke detector can alert the home occupants to give them the time needed to safely exit the building. Fast response of the detector is of great importance since even one or two minutes may make the difference between a safe exit and loss of life in a typical home fire, due to the speed of propagation of the conflagration.

There are currently two basic types of smoke detectors. The ionization type senses changes in the electrical conductivity of the air in a chamber which is subject to radiation. The photoelectric type on the other hand senses light scattering in a detector chamber. Both devices respond to the presence of particulate matter or particles of combustion byproducts which, when present in great quantities, are visible as smoke. However, in the earliest stages of a fire, these combustion byproducts take the form of invisible aerosol, consisting of very fine particles suspended in air. It has been determined that such aerosols are generated at early stages of the fire, even before actual ignition, merely as a result of sufficient heating of combustible materials.

Detectors are typically provided with a "test" feature which is actuated by pressing a test button or pulling a switch mounted on the housing of the detector unit. Such "testing" however, is not a true operational test of the detector: it actually only verifies that power is supplied to the detector circuit and that the audible alarm does function. The test does not truly verify the responsiveness of the sensor element to the presence of smoke or combustion particles in the test chamber of the device. It is possible for a detector to respond as expected when the test button is pressed, while failing to respond to the presence of smoke. Smoke detectors of either type are susceptible to failure because the sensitivity of the electronic detector may deteriorate over time due to accumulation of dust, grease, corrosive fumes, moisture or other environmental contaminant. Aging of the electronic devices may contribute to such malfunctions.

For these reasons, it is desirable to provide means by which a true operational test of the smoke detector can be carried out in a convenient manner.

Operational testing of smoke detectors is described in U.S. Pat. No. 4,301,674 issued to these applicants. The Haines et al. '674 discloses a chemical formulation which, when discharged in aerosol form in the vicinity of a smoke detector, effectively emulates the presence of smoke particles. This earlier formulation is packaged in spray cans to allow easy, convenient and reliable operational testing of smoke detectors. Previous to the '674 patent, smoke detector testing was conducted either by actually generating smoke in the vicinity of the detector, or by enclosing the smoke detector in a housing to create an artificial environment into which was introduced an aerosol spray. The former approach was inconvenient and often dangerous while the latter was likewise inconvenient in that an enclosure had to be placed around the detector and furthermore, was less than a true operational test of the device in that the enclosure was often flooded with the trigger substance and consequently did not test the low level sensitivity of the device which is necessary to provide early warning of a fire.

While the '674 patent therefore represents a substantial advance in smoke detector testing, it has recently developed that certain ingredients of the formulation used in the test formulation appear to be environmentally undesirable and possibly hazardous to human health. Specifically, that formulation included three ingredients: a) hydrocarbon propellant, b) isopropyl alcohol as a carrier medium and c) dioctyl phthalate, an ester of phthalic acid, which is dispersed under pressure by the aerosol to create an aerosol effective for activating both photoelectric and ionization type smoke detectors. The formulation was dispensed from an aerosol can equipped with a finger operated dispensing valve.

Smoke detectors are usually mounted on a ceiling or high up on a wall where hot combustion gases tend to accumulate. This location places the detectors out of easy reach for the individual of average height holding a spray can in his or her hand. Often it becomes necessary to use a ladder, step stool, or the like to get adequate access. Further, the quantity of spray delivered is left to the discretion of the user. While a small discharge will usually suffice, but because a small delay is usually inherent in the detector circuit users tend to continue spraying until the detector alarm goes off. Consequently, a considerable amount of the formulation is needlessly wasted, and builds up on the housing of the detector. Also, low cost aerosol dispensers discharge a substantial volume of coarse liquid particles along with the fine aerosol mist. For test purposes, it is the aerosol mist which is desirable and effective, while the coarse spray merely wets the detector.

Further improvement is desirable in the formulation of the spray composition to make it environmentally safer and to avoid use of substances possibly hazardous to human health.

SUMMARY OF THE INVENTION

This invention is an improved formulation for activating a smoke detector by emulating the full range of fire signals of combustion products when delivered to the smoke detector in aerosol form. The novel formulation includes a propellant and an active ingredient consisting of one or more linear alkyl phthalate esters characterized by linear carbon chains of either seven or nine carbons in length, the alkyl phthalate esters being present in a proportion of between 10% and 1%.

The alkyl phthalate esters are selected from the group comprised of:
  C7-9 alkyl phthalate ester
  C7 alkyl phthalate ester and
  C9 alkyl phthalate ester.

The presently preferred propellant is a hydrocarbon propellant consisting of a propane and isobutane mixture, preferably 42% propane and 58% butane. The mixture of alkyl phthalate esters is preferably present in a proportion of approximately 2% with 98% propellant.

These and other advantages of the present invention will be better understood by reference to the detailed description of the preferred embodiments below.

DETAILED DESCRIPTION OF THE PREFERRED EMBODIMENTS

Figure 1:
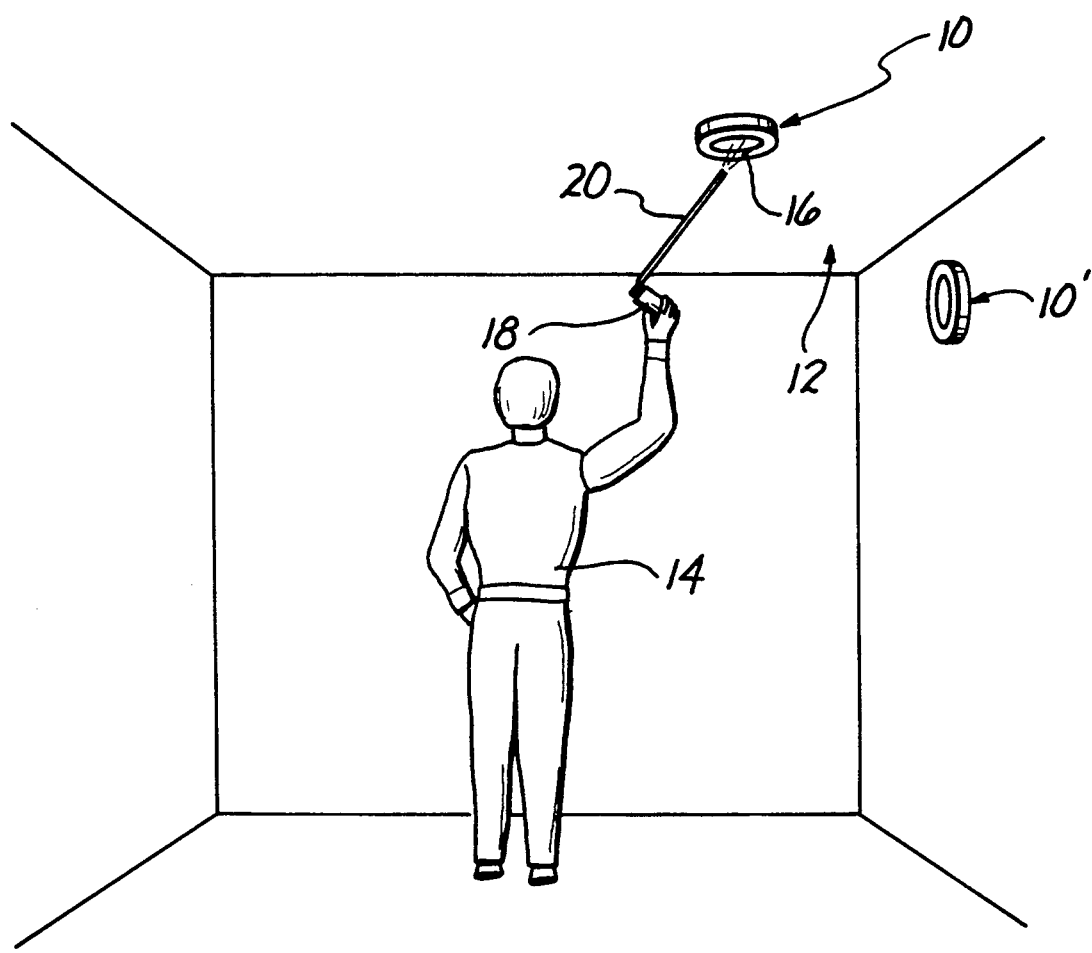
FIG. 1 is a perspective view of a typical room with a ceiling mounted smoke detector, illustrating the delivery of the test formulation;.

U.S. Pat. No. 4,301,674 issued to these applicants describes a formulation for simulating the presence of combustion products for deliberately activating smoke detectors of both the ionization type and photoelectric type, as an operational test of the detector. Such testing has become widespread and routine in many health, industrial and commercial installations. Hospitals, hotels, airports and many other large institutions contain large numbers of smoke detectors which, in the interest of public safety, require periodic testing The formulation disclosed in the '674 patent, which is easily dispensed from a conventional hand held aerosol spray can, makes this task relatively easy. The prior formulation however, was based on dioctyl phthalate (DOP), an ester of phthalic acid, as the active ingredient. While this product and the formulation containing the same was effective for the intended purpose, DOP has since become suspect as a potential health hazard.

A search was therefore undertaken to identify materials which meet the following four requirements: non-toxicity to users and others, non-damaging to the planet's ozone layer, non-damaging to the detector's reliable operation, and sufficiently volatile to avoid undue residue build up on the detector when applied in the concentrations specified below and delivered in a correct manner to the detector. All of the materials were tested in a conventional aerosol spray dispenser of 2.5 ounce capacity using a hydrocarbon propellant consisting of propane and isobutane mixed in approximately equal proportions. Testing of each substance for wetness or residue was conducted by delivering a measured squirt comparable to what would be delivered to a smoke detector for test purposes, to a mirror surface from measured distances between six inches and five feet. The test mirror surface was visually inspected following each spray discharge and subjectively judged for degree of wetting.

The following materials were tested with the results given below.

| Material | Result |
|---|---|
| Silicone | unsuccessful in actuating either ionization or photoelectric type detectors; |
| Rudol (1) | unsatisfactory |
| Dimethyl phthalate | excessively volatile and required spraying very close to the detector to prevent premature dissipation of the material |

(1) an ester type volatile mineral oil

Other materials tested included alkyl phthalate ester compositions marketed by the BASF Corporation, Chemical Division, Parsippany, New Jersey under the trade name "Platinols", different composition being identified by a corresponding number.

| | |
|---|---|
| Platinol 711P | produced excessive wetting and visible residue |
| Platinol 79P | produced the least degree of wetting while being effective for activating both ionization and photoelectric type smoke detectors from a distance of as much as five feet. |

Platinol 79P is a mixed linear phthalate containing a mixture of:

| | |
|---|---|
| alkyl C7 phthalate ester | (CAS68515-41-3) |
| alkyl C9 phthalate ester | (CAS68515-44-6) and |
| alkyl C7, C9 phthalate ester | (CAS68515-45-7). |

It was further discovered, by testing samples containing varying concentrations of the active ingredient, that the high concentration (up to 25% by Weight) of the phthalate ester active ingredient used previously by applicants is unnecessary, and that Platinol 79P is effective in proportions of less than two percent relative to the propellant, (i.e. mixed with 98% propellant by weight), for actuating either type of smoke detector while leaving no visible residue for a short spray discharge sufficient to activate the smoke detector. If desired, up to ten percent by weight of the 79P product may be used, although for most applications such high concentration is unnecessary. The Platinol 79P is distinguishable from the previously employed dioctyl phthalate in that the latter is characterized by branched carbon chains, while the presently preferred alkyl phthalates have linear carbon chains. The linear chain phthalates are characterized by higher volatility than branched phthalates of equal length.

Turning now to the attached drawings, FIG. 1 illustrates a typical room having a smoke detector 10 mounted on a ceiling 12, and for illustration, a smoke detector 10' mounted on a wall. A user 14 standing on the floor of the room is shown in the process of delivering an aerosol 16 of a smoke detector test formulation contained in an aerosol spray dispenser 18, held in and actuated by the user's hand. The spray dispenser 18 is shown fitted with a spray delivery system 20. The aerosol cloud can reach a few feet from dispenser 18 to reach a ceiling mounted or wall mounted smoke detector up to a height of e.g. 10 feet.

It has been found that users all too frequently deliver grossly excessive amounts of the formulation to smoke detectors. This results in part from the fact that many smoke detectors have an inherent delay in their response to the presence of the trigger substance. The tendency for the user is to continue spraying until the smoke detector alarm is activated, rather than deliver a short spray and then wait for the response. Another tendency is for the user to spray too close to the detector. Either tendency results in gross misuse of the product. The active ingredient in the test formulation, when delivered to a surface in small amounts in aerosol form, tends to evaporate with very little or no residue. If applied in grossly negligent fashion however, the material can build up on surfaces of the detector housing, attracting dust and causing esthetically unsightly deposits. No damage has been reported to the proper operation of smoke detectors after millions of tests conducted with the prior formulation of these applicants. Nevertheless, the possibility of diminished sensitivity by the detector must be considered if excessive amounts of this test formulation are repeatedly applied in a grossly negligently manner.

Dust and dirt adhere to the sticky fluid making the device aesthetically unsightly. Therefore, it is desirable to minimize the quantity of test formulation delivered to the detector.

While preferred embodiments of the invention have been described and illustrated for purposes of clarity and example, it must be understood that many changes, substitutions and modifications will become apparent to those possessed of ordinary skill in the art without thereby departing from the scope and spirit of the invention which is defined by the following claims.

What is claimed is:

1. A formulation for discharging from a hand held aerosol dispenser having a finger operated spray nozzle for activating both photoelectric and ionization type smoke detectors by simulating the presence of combustion products when applied to the detector in aerosol form, consisting of:
   a hydrocarbon propellant;
   one or more alkyl phthalate esters characterized by carbon chains of either seven or nine carbons in length and selected from the group consisting of:
   C7, C9 alkyl phthalate ester
   C7 alkyl phthalate ester,
   C9 alkyl phthalate ester, and mixtures thereof,
   said one or more alkyl phthalate esters being present in a proportion of approximately 2%.

2. The formulation of claim 1 wherein said hydrocarbon propellant is selected from the group consisting of isobutane and propane.

* * * * *